Oct. 10, 1950
C. B. ARNOLD
2,525,511
LIQUID MIXER WITH AUTOMATIC TEMPERATURE REGULATION
Filed April 29, 1948
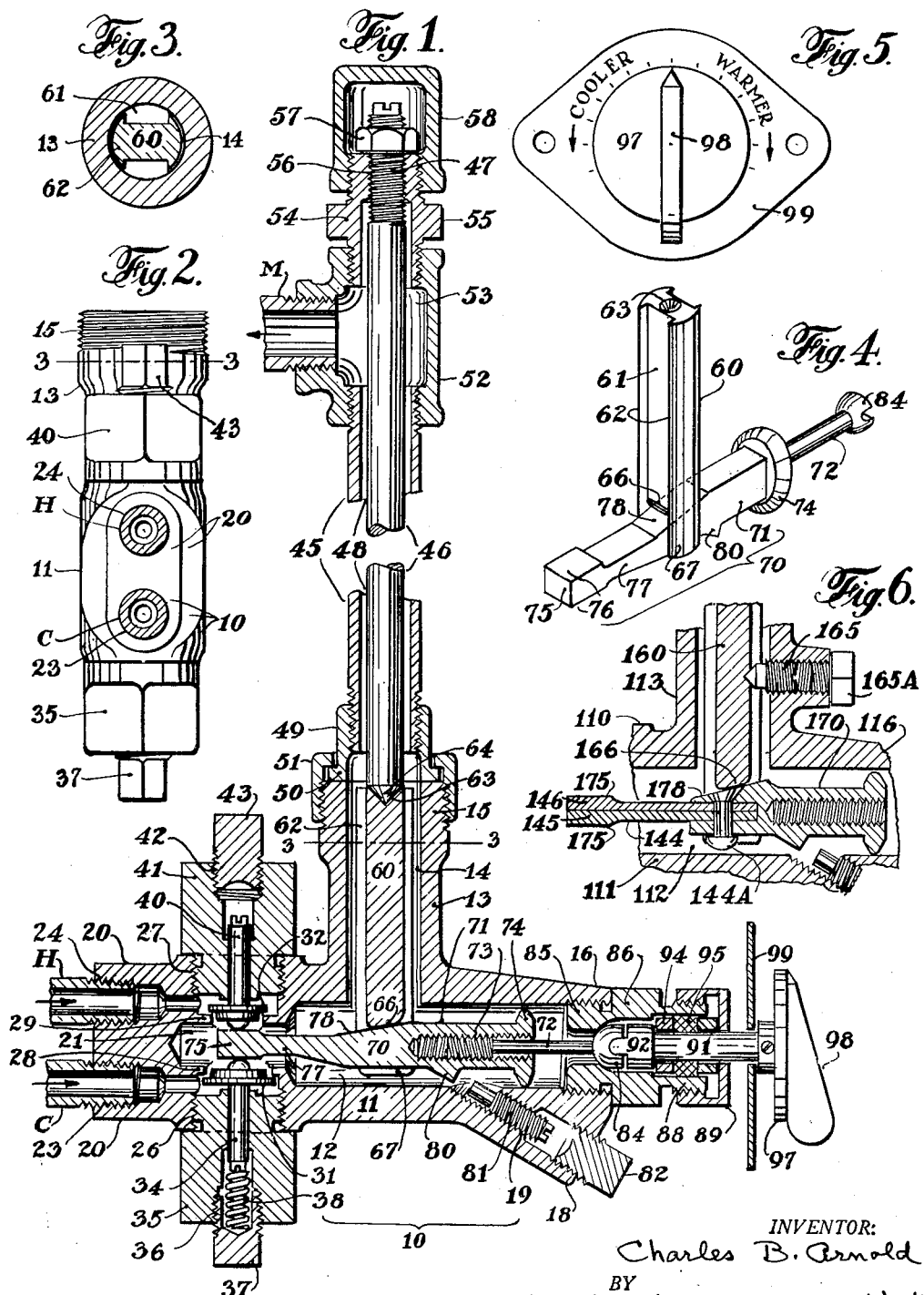
INVENTOR:
Charles B. Arnold
BY
Morrison, Kennedy & Campbell
Attorneys.

Patented Oct. 10, 1950

2,525,511

UNITED STATES PATENT OFFICE 2,525,511

LIQUID MIXER WITH AUTOMATIC TEMPERATURE REGULATION

Charles B. Arnold, Hempstead, N. Y.

Application April 29, 1948, Serial No. 23,893

14 Claims. (Cl. 236—12)

This invention is a novel liquid mixer with automatic temperature regulation, being in the nature of a duplex valve means or unit which receives under inlet valve control supplies of relatively hot and cold liquids, as water, and under thermostatic master control combines and proportions these to produce a predetermined or desired delivery temperature. The invention is adapted to be used for the combining or mixing of any relatively hot and cold liquids, that is, a hotter and a colder liquid fed under supply pressures, where the flow rates or infeeds of the two liquids are desired to be proportioned to yield a final delivered flow of a predetermined temperature which is steady or approximately so according to the needs. A typical example is the case of a so-called shower or sprinkler valve adapted to deliver the mixed liquids at the desired controlled temperature, either for personal use, or other use, such as for process and other industrial purposes.

A general object of the invention is to provide a liquid mixer unit or apparatus of simple, rugged and inexpensive structure, and reliable in its action, adapted to receive separately the pressure supplies of the hotter and colder liquids and to proportion and mix them or blend them as required to deliver the resultant flow within approximately close limits of desired delivery temperature, by the use of thermocontrol means located beyond the mixing chamber ahead of the final delivery. A particular object is to provide a valve with the characteristics thus described and of compact and convenient structure and operation adapted for shower bath purposes.

Another object is to provide in a liquid mixer of the kind specified a means of ready manual adjustment and setting of the automatically controlled delivery temperature, operable by a simple regulator including a control handle and preferably an indicator, these cooperating for the setting action either by calibration of the setting parts, or by showing the directions of rotation to yield a warmer or a cooler mixture, as under observation. A supplemental purpose of the invention is to provide means for determining a limit of maximum adjustment of the controller handle, in order to prevent an inadvertent or accidental setting to deliver at an unsafely high temperature.

A further object is to provide, in association with a thermostatic control means for temperature regulation of a liquid combination, a means adapted to compensate for pressure variations, especially relative variations, in the hot and cold liquid or water supplies, which variations are an ordinary cause of inaccuracies in known temperature control means; and moreover, specifically to accomplish this purpose supplementally from such pressure irregularities without reliance upon the thermostatic action, thus to minimize undue changes in delivery temperature.

A yet further object is that the above-mentioned automatic temperature control means and the supplemental control means for automatically compensating for supply pressure variations can be accomplished and harmonized by the dual functioning of the same elements, including the cold and hot inlet valves, and their actuating means.

An additional object, in such a water mixing unit, is to provide a safety means of simple and reliable character whereby, if and when the cold water supply pressure and flow volume should suddenly drop substantially below a predetermined safe value, the hot water supply will automatically become promptly cut off, or substantially so; thus to preclude the occurrence of an excessively high temperature of delivery, with possible scalding and harmful results, in any case wherein the cold supply becomes inadvertently or unexpectedly cut off; such safety control means being operable independently of but cooperatively with the main or thermostatic master control action. Again, in the interest of simplicity, the hot and cold valves themselves are arranged to effect this object, rather than requiring supplemental pressure control means therefor.

Other and further objects and advantages of the invention will appear in the hereinafter following description of an illustrative embodiment of the invention or will be understood by those conservant with the subject. To the attainment of such objects and advantages the invention consists in the novel liquid mixer or duplex valve means, and the novel features of method, operation, combination, construction and detail herein illustrated or described.

In the accompanying drawings,

Fig. 1 is a general view of a liquid mixer valve shown in central longitudinal sectional view, embodying a preferred type of thermostatic device having rod elements.

Fig. 2 is a left end elevation of the lower part of Fig. 1.

Fig. 3 is a horizontal sectional view of a constructional detail taken on the section line 3—3 of Figs. 1 and 2.

Fig. 4, in perspective view, shows a detail of structure of certain lower central parts seen in Fig. 1.

Fig. 5 is a righthand end elevation of the adjusting or setting means at the lower part of Fig. 1.

Fig. 6 is a partial longitudinal sectional view, corresponding to Fig. 1 but showing a different type of thermostatic device in the nature of a flexing bimetal strip.

To the attainment of such objects the invention in one aspect consists in a liquid mixer or valve unit adapted regulably to proportion inlet supplies of cold and hot liquid to deliver a desired temperature of mixture, the same having a hollow casing from the chambered body of which extend a first section at the intake end, a second or outtake section, preferably at the top side, and a third section giving access for regulating and adjusting purposes; and associated therewith an opposed pair of inlet valves in the intake section for the cold and hot liquids, each valve consisting of a seat or port with a movable gate and so arranged that the inlet pressure and flow therein tend to close the valve. An important further element is an immersed control member shown as a longitudinal beam mounted with at least its free or intake end shiftable transversely, as up and down, in the chamber and extending into mechanical transmitting relation to, preferably between, the two valves so as to open further either thereof while closing further the other, whereby to alter the proportions of cold and hot liquid admitted to the chamber. The immersed thermostatic part of the unit may be described as a mechanism which includes inter alia the control beam, and is responsive to temperature changes in the flowing mixture and is operative through the shifting of such intake end of the beam to cause the further opening of the cold valve and further closing of the hot valve with rise of mixture temperature, and vice versa, thereby to maintain a steady temperature of delivered mixture. With these is combined the practically essential setting means which, from the exterior, extends through said access section of the mixer casing and is operable, either automatically or manually, to adjust the transmitting relation of the control beam to the valve whereby to regulate the maintained delivery temperature.

The mixer principles so set forth are embodied both in the main form, Figs. 1 to 5 of the drawings, and in the second form, the modification of Fig. 6. In the first form the thermostatic means, specifically, comprises an elongated rod mounted at its remote or upper end and immersed in the mixture flowing through and beyond the outtake section of the casing, and having a downward continuation or extension into operative connection with the control beam, thereby to shift the beam and cause increased opening of the cold and simultaneous closing of the hot valve with rise of mixture temperature, and vice versa. In the second form a bimetallic strip is associated with the beam to actuate the valves by its up-and-down flexing under temperature changes.

The first embodiment of the invention, shown in Figs. 1 to 5 illustrates the principles of the invention in the best form which applicant has contemplated, in which form the mixer comprises a longitudinal or horizontal casing body centering around a longitudinal axis; and outstanding therefrom a longitudinal intake and a transverse or upright outtake section, these extension sections and body being interconnected in tandem so that the hot and cold streams of liquid or water may enter the first section by cold and hot water inlets C and H respectively, constituting supply pipes leading inwardly for the confluence and mixing of the two streams, which flow through the first section and the mixing chamber and thence transversely or upwardly through the second section, and eventually to a mixture outlet M shown as a delivery pipe, which may lead and deliver to a shower or other sprinkling or distribution means.

In this specification, it is to be understood that expressions of direction, position and the like, such as up and down or leftward and rightward are employed for convenience of description, and that such terms are not intended as limitations upon the principles of the invention.

The description may well commence structurally with what may be considered the main fixed element or valve casing, designated 10 as a whole, and which is a walled hollow shell, made preferably as a single casting. This general element or fixed casing, as shown, comprises a central or body portion 11 surrounding the axis of the horizontal section of the mixer, such axis extending leftwardly and rightwardly; and as a matter of functional design the body 11 being of elliptical form, as best seen in the left end view Fig. 2. The space or recess 12 within the body 11 is of ample size to constitute a liquid mixing chamber, this preferably being a cylindrical recess formed by boring from the righthand end of the body, the mixing chamber 12 receiving the already combined liquids from the left end and discharging the mixture upwardly. The unitary or integral valve casing 10 is formed also with a transverse outlet part or upward extension 13, providing a bored passage 14 leading upwardly to and through its threaded top end 15. The rightward extension 16 of the valve body 11 has a tapped end to receive part of a regulating means to be described. At a transverse or lower side the body has a protrusion or hump 18, near the righthand end of the body, this being bored and tapped at 19 to receive an adjustment limiting means to be described. The elements or extensions 11, 13, 16 and 20 will sometimes be referred to as the body, outtake, access and intake sections of the mixer casing 10.

Continuing the description of the valve casing 10, it is formed at its left end with a long leftward extension 20, preferably elliptical in left view outline to match the body 11, and being formed with a substantial axial recess 21, in the nature of an antechamber wherein the cold and hot liquids meet in confluence for their flow into the mixing chamber 12. The left extension 20 is formed, at its lefthand extremity, with two tapped bores, the underneath bore 23 having coupled with it the threaded end of the longitudinal cold water inlet pipe C and the upper bore 24 likewise having the hot water pipe H screw-engaged therein. Each of these inlet bores is substantially reduced in diameter as it extends inwardly, to the right, where the passage so formed unites with another interior passage leading to the antechamber 21. The left casing extension 20 is formed also with a transversely tapped bore 26 at its underside to receive the cold water valve to be described, and with a top side tapped bore 27 similarly for the hot water valve. These two receiving bores 26 and 27 are carried in transverse alignment clear through the body extension 20, and thereby to and through the antechamber 21, excepting that near the center this tapped bore is reduced in diameter thereby to leave an opposite pair of annular flanges extending into the bore and forming, respectively, a flanged seat 28 for the cold valve, and above it a similar flanged seat 29 for the hot valve, the former being larger to give a preponderance in pressure and action.

The structural parts 11 to 29 thus described constitute substantially the entire unitary valve casing or main fixed element 10.

Describing next the two valves controlling the inlet of cold and hot water respectively, through the inlets C and H, which valves for convenience will sometimes be called the C-valve and the H-valve; these are located in the flow path between the respective inlets and the antechamber 21, which in turn delivers into the mixing chamber 12. Cooperating with the C-valve seat 28 is a gate or disk 31 formed with a flange which bears against the outer side of the seat when closed, so that for its opening it retracts outwardly or downwardly against the current, and at its inner side is provided with a contact button for cooperation with the control elements to be described. Similarly the H-valve is provided with a valve disk or gate 32, adapted to close the outer side of the seat 29, so that it retracts upwardly against the stream for opening, and it has an instanding contact button shown in central line with the C-valve disk button. These described valve parts are preferably in transverse or vertical alignment, and by their controlled movements they determine the quantities and proportions of cold and hot water admitted through the valve seat passages into the antechamber. The shiftable beam head 75 to be described is in mechanical relation to both valve gates, specifically between them, so that an upswing opens the H-valve and closes the C-valve and vice versa. In other words, as the interposed valve shifter or beam head 75 approaches either valve its action is to open further that valve because of the arrangement that the gate or disk of each valve is at the upstream side of its seat or port.

In further structural details, the C-valve gate or disk 31 has an outwardly extending stem 34. A nipple 35, shown square headed, is threaded to engage in the tapped bore 26 and is formed with a central bore through which the stem 34 is slidable. The nipple has also a tapped outer bore recess 36 which is engaged and closed by a threaded plug 37. Within said recess is shown a helical spring 38 arranged under compression between the C-valve stem 34 and the plug 37, thereby giving a tendency or bias for the C-valve to move closingly toward its seat. Said spring also is of strength to offset the excess weight of the stem 34, the gate 31 and the parts above which rest thereon. The H-valve is similarly constructed, its disk 32 having a stem 40 which extends outwardly or upwardly thereby utilizing gravity as a bias means tending to close the valve. The stem 40 slides in a bore in a threaded nipple 41 which is square headed and at its outer end is formed with a tapped bore closed by a screw plug 43. The relation of these parts to the other parts of the mixer, and the relation of the valve disk contact buttons to the member or beam head 75 which is arranged between them and operates to control the two valves, will be described in further detail.

Before describing the thermostatic element of the mechanism there is first mentioned an intermediate part of the mechanism, namely the control member 70, being a shiftable element, as a beam, bar or lever, immersed in the liquid in chambers 12 and 21, and in the first form arranged intermediate the responsive thermostat means and the inlet valve pair to transmit the primary or master control to the latter; this beam specifically being mounted or pivoted at its far or righthand end and having its free or swingable left end positioned to effect adjustment of both valves simultaneously and oppositely; and being supported in operative relation both with the thermostat active terminal and with the two valves in a manner to transmit the control action while maintaining the beam member in its working relation to these other elements.

The thermostat means is embodied in the transverse or upright section of the mixer and includes an upflow continuation to the delivery outlet M. Any thermostatic pair can be used so long as its members have a notable difference in coefficient of thermal expansion and have good mechanical properties; for example, the low-coefficient material may be iron or steel and the high may be aluminum or an alloy. The percentage increase in length per degree centigrade of temperature rise may be as much as twice as great with the latter as with the former metal, the difference being the factor affording the relative mechanical movement needed to give the active control of the inlet valves. In general the thermostat structure hereof preferably embodies an elongated rod immersed in the flowing liquid within an elongated tube, and preferably the higher coefficient metal or aluminum is used for the interior or rod member, steel for the tube.

In Fig. 1 is shown a surrounding upright tube 45 in tandem with the casing extension 13 below and with other hollow members above, to be described; the entire height of such surrounding system being composed of iron and constituting the tubular portion of the thermostat. Within the tube is the complementary enclosed rod 46 of aluminum, clamped or anchored above and at its lower end being connected, e. g., in contact, with a prolongation piece 60 to be described, the combination of these two members constituting the immersed members of the thermostat, with the higher coefficient of expansion. At its top end 47 the thermostatic rod 46 is threaded for clamping or mounting purposes, and the rod is sufficiently small in diameter to leave a substantial annular flow channel 48 between the rod and the surrounding tube.

The outer or tubular member 45 of the thermostat has its lower end threaded, and adjustably coupled thereto is a tapped collar 49, to take part in the rigid mounting of the tube upon the casing extension 13. The collar is formed with an outwardly extending foot or flange 50, and a union 51 has its threaded end engaged upon the extension 13 and flanged inwardly at its upper end to overlap the foot 50 and clamp tightly the collar 49 atop the extension 13, suitable washers or packings being assumed in this and similar situations. At the top end of the upright tube 45 is a rigid continuation in the form of a T coupling or joint 52, one longitudinal opening of which is screwed down upon the top of the tube, the coupling member having an interior space or flow passage 53 through which the liquid mixture passes from the tube 45 to the delivery outlet M. Above the T the closing and rod mounting members may conveniently be as shown, there being a double threaded straight fitting or nipple 54, the lower end of which is engaged in the T coupling, this fitting having a hex or wrench extension 55, and thereabove a tapped bore 56 in which the threaded upper end 47 of the rod is screwed and held, being adjustable vertically by means of a nick at its top end, and being clamped rigidly by means of a lock nut 57. Surrounding these members is a closure cap 58 engaged tightly upon the upper threaded end of the fitting 54.

The effective length of the thermostat, comprising tube 45 and rod 46, is from the point where the threaded upper end of the rod is connected to the high fitting 54 downwardly to the top end of the valve casing extension 13 level with the lower end of the rod; or, if the rod prolongation piece 60 be of the same high-coefficient metal, then downwardly substantially to the control beam member 70. This permits a substantial and effective degree of movement of the lowest end of the rod or its prolongation adequate for the mechanical control actions of the valve means.

The thermostatic rod member consists, in effect, of its main or upper portion 46 and its prolongation piece 60, also in the nature of an upright rod and preferably composed of the same metal. By this division of the rod member easier manufacture and assembly are provided, and the prolongation may consist of a preferably loose piece guided within the upright casing extension 13 and readily removable for inspection, cleaning or other purposes. These parts are shown in Figs. 1, 3 and 4, which indicate that the piece 60 has a sliding fit within the extension 13 but is formed with vertical recesses 61 affording ample passages for upflow of liquid, while the segments 62 between the recesses afford the guidance of the piece within the extension. In order that the rod 46 may be centralized, the prolongation piece is formed with a conical recess 63 at its top end, the rod 46 having a complementary conical lower tip end 64, which is centered by its engagement in said recess.

Except for convenience, the rod prolongation 60 might be unitary with the rod, excepting further that the separate free movement of the prolongation may, at special times, afford an operative advantage in its cooperation with the control beam 70 below. In the form shown the prolongation piece has its lower end 66 designed to engage the control beam 70, being shown as resting upon the top side of the beam, preferably to being secured to the beam, this arrangement permitting a downward thrusting action against the swingable beam. The lower end 66 might be provided with a roller to facilitate the adjusting movements to be described, but it is shown as formed with an inclined rounded contact surface bearing upon a similar incline, in the nature of a cam or wedge, at the upper side of the beam.

In addition to its up and down swinging movements the beam is provided with means for effecting left and right sliding movements, for which actions the parts are constructed as described. The beam is preferably squared at its upper and lateral sides, and the rod prolongation piece 60 is provided with opposite cheeks or drop flanges 67 straddling the beam and thereby preventing rotation of the beam about its longitudinal axis and at the same time maintaining the prolongation piece against rotation.

Coming to the control member or beam 70, this has been hereinabove largely described as an operative element intermediate the thermostat rod element above it and the inlet valve system at the left. Its free left end is swingable upwardly and downwardly by reason of a pivot means near its right end. The beam also, in connection with regulation of the valve, has the described right and left bodily or sliding movements, and its form is such as to adapt it to the various actions to be described.

The swingable control beam 70 is adapted to take part in several cooperative valve control functions, presenting a structure which it is believed is novel in respect to the means for affording each function and as well the utilization of the same structural parts to perform all of such functions. In the illustrated example the control beam is formed with a longitudinal shank portion 71; and it has a longitudinal extension or stem 72, which is joined to the shank by a loosely fitted threaded connection giving a pivoting action, the stem part continuing rightwardly to the swinging pivot at its extremity, to be later described. The beam stem 72 is formed with threads at its left end, where it enters a tapped bore 73 formed in the righthand end of the shank 71. This affords a means of lengthwise adjustment whereby the beam shank or body may at will be slid leftwardly or rightwardly, within the casing access section 16, by the turning of the threaded stem 72, and the screw connection may be somewhat loose to facilitate the swinging of the beam.

To provide a fulcrum edge for the beam and to guide generally or center the longitudinal adjusting movements of the beam, its shank 71 is formed with a peripheral flange 74, extending substantially to the inner wall of the valve casing 11, but preferably with a slight clearance or looseness, and resting on the bottom of the chamber 12. At its far left end the swinging beam is formed with a head 75 having horizontal top and bottom faces which are flat, parallel and smooth, and so adapted for operative contact with the buttons on the gate members of the C-valve and H-valve. Closely to the right of the head the beam is preferably deeply recessed above and below to form a constricted neck 77, into which the valve buttons may drop when an extreme leftward adjustment of the beam is made, which may be done at will to render wholly inoperative both valves, thus serving as a cut-off of both hot and cold water.

For the setting or regulating of mixer action an important feature is a formation of the swingable control beam 70 whereby near the middle of its top side there is formed a slanting surface 78, in the nature of a cam or wedge, with a gentle slope upwardly toward the right. This cooperates with the longitudinal adjusting means to be described in the determining of the desired delivery temperature, so that for example when the beam is bodily adjusted rightwardly its middle portion, pressed up by the C-valve and held down by the low contact end 66 of the thermostat rod, is permitted or caused to swing slightly upwardly, as allowed by the wedge surface 78 and according to the extent of the adjustment; thus bringing about an alteration in the relations of the two valves resulting in the relative admission of more hot water and less cold water, such a rightward retraction of the beam therefore constituting a regulation for the delivery of a hotter mixture, the temperature of which thereafter remains steady until the regulating means to be described is operated again to shift the control beam leftwardly or further rightwardly.

Completing the description of the structural features of the control beam, reference is made to a downwardly projecting shoulder 80 thereof, in the nature of a stopping contact, which cooperates with an adjustable stop in the form of a threaded stud 81 which, by a screw driver, can be advanced or retracted for a suitable initial setting, so as to bring it into the path of adjustment of the shoulder 80 in a position to limit the rightward adjustment of the beam and thereby prevent the user of the valve means from inadvertently adjusting its action so far as to deliver an unduly hot liquid mixture. When the stopping adjustment is thus effected the bore 19 within the valve casing protrusion 18 is tightly closed by means of a screw plug 82.

Referring further to the combined pivoting and bodily sliding motions of the control beam, and assuming as an example the case of pressure supplies of water at 70° and 130°, with a setting of the beam to deliver at 100°; if the mixture for any reason starts to rise above 100° the thermostat rod lengthens, causing the beam to swing down, opening more the C-valve and closing more the H-valve; and vice versa. The rod, in the illustrated form, can act in one direction only on the beam, it can thrust down but not pull up; but the beam is normally held up with its top surface 78 in contact with the low end 66 of the rod by other means, notably by the cold water pressure acting upwardly through the C-valve upon the beam left end head 75, this pressure preponderating over the depressing tendency of the H-valve due to the differential sizes of the valves, shown as an example in the approximate proportions of effective areas of C-valve to H-valve as 5 to 3. A biasing spring as 38 can fortify this action. However, since any descent of the beam tends to close the H-valve there is no danger of excessively high temperature of mixture.

The control beam's swinging and sliding movements are reconciled as described, being brought about by the action of the low contact end of the thermostat rod in cooperation with a suitable regulating means such as that shown at the righthand end of Fig. 1. At the righthand end of the stem 72, which extends from the beam, is arranged a universal joint or pivot taking part both in the sliding and the swinging movements, this device comprising a ball member 84, shown as a hemisphere, mounted on the extremity of the stem 72, and a socket member 85 which is interiorly concave to receive the ball 84, and is threaded for engagement in the tapped bore of access section 16 of the valve casing; said socket member 85 being preferably an integral part of a bonnet or nipple member 86 which is threaded also at its righthand extremity 88. Applied thereon is a closure cap 89 confining the interior parts, holding them in position, and preventing water leakage.

It will be observed that the control beam 70 may readily be adjusted bodily toward the right and left by the mere rotation of its stem extension 72, the threads upon the left end of which engage with the threads within the bore 73 of the beam shank, the latter being non-rotatable. When the stem is turned clockwise, looking from the right, the control beam is shifted toward the right, its cam slant 78 therefore shifting in the direction to permit the beam and its head 75 to rise slightly, thus opening further the H-valve and closing further the C-valve, giving a presetting for changed proportions and a higher delivered temperature. To effect such rotation of the stem, in either direction, there is provided a mechanical setting means including a regulating spindle 91 which extends through a hole in the closure cap 89 and at its inner or left end carries a cylindrical block or flange 92 which in turn carries at its left side a diametrical rib engaged in a diametrical groove in the hemispherical member 84; these members 84 and 92 therefore constituting a universal joint or ball and socket connection. Between the spindle 91 and the inner surface of the nipple member 86 are indicated washers 94 and packing 95, these in a conventional way being compressed into place by the tightening of the closure cap to afford a tight joint within which the regulating spindle 91 can be turned. The pressure of cap 89 serves also to hold in their proper leftward positions the train of parts 92, 84, 72, 70 and 75. Removing the cap gives access to some of said parts; removing the bonnet 86 gives complete access for removal and insertion thereof.

The regulation or setting for the desired temperature or changes of temperature may be performed either manually or by automatic or times means, according to the conditions presented. Figs. 1 and 5 show a manual adjustment embodying a regulator disk 97 attached to the exterior end of the spindle 91, with an index or pointer 98 thereon which may be finlike to serve as a thumbpiece or handle. The index is movable over an indicator or inscribed plate 99. When the handle is turned this rotates the spindle and the stem 72 and thus shifts the shank 71 to slide the control beam to change its relation to the thermostat and thereby to the inlet valves. Thus is determined the temperature at which the thermostat will maintain the liquid mixture. The regulation may be under observation or by trial, during operation, for example by turning the handle while the temperature is observed by personal touch or by a thermometer held in the liquid. The indicator plate 99 carries arrows showing that clockwise shift regulates for warmer, counterclockwise for cooler delivered water. Or the temperature may be controlled and set by predetermination, in which case the plate or dial 99 will carry a temperature scale around which the index can be shifted. In that case the threads between the beam shank and stem should have a sufficiently great pitch or the wedge surface 78 a sufficiently steep slant that the index will not need to make more than a single revolution over the dial in performing the full range of desired regulation.

The operation of the specifically described first form of liquid mixer will now be further explained along with certain supplementary and auxiliary functions and actions. The main action is the master control, wholly automatic under the thermostatic operation, the thermostat rod terminal or contact end 66 acting through the control beam to move the inlet valves as necessary to maintain steadily the desired delivered temperature, preventing undue departures. If that temperature should tend to rise, the rod would lengthen, lowering the beam, increasing slightly the C-valve open condition and correspondingly closing slightly the H-valve, thus correcting the departure and restoring the selected temperature. Normally, both valves remain open, in median positions, proportioning the inflow of the two liquid components, the degree of opening of the respective valves varying oppositely under differing conditions. The preponderating area of the C-valve tends to cause an overbalancing upward pressure upon the head 75 of the swinging beam and this, together with the optional use of the lifting spring 38, maintains the contact buttons of both valves normally in constant contact with the beam head.

These preponderating beam-lifting tendencies function to cause a slight stress in the parts with compression of the thermostat rod; and this condition, taken with the ability of the intermediate parts to be strained or racked to an appreciable extent, permits the beam head to be strained upwardly or relaxed downwardly to a small but operative degree, apart from its thermostat-produced movements, and thus functioning as a means of effecting minor adjustments of the inlet valves, as will be further described. When there are changes in conditions, whether by regulation, or variations in the inlet pressures or temperatures, the thermostat responds promptly, although with an appreciable lag, to restore equilibrium and maintain delivery of mixture steadily at the desired temperature.

Another function of the invention is the already described regulation for the desired liquid temperature, performed to give an adjustably predetermined temperature by setting for a desired temperature, by observation or otherwise. This regulation broadly consists in a readjustment of the mechanical connections extending between the thermostat and the inlet valves, and preferably consists of an endwise movement or adjustable sliding of the beam by the handle 98 through the elements 91 and 72 the stem 72 being screwed further into or out of the beam shank 71 equivalently to a telescoping motion. The essence of the regulating action is the adjustment of the mechanical device or wedge 73 so that the operating position of the beam may be higher or lower according to the requirements. Such adjustment of the cam or wedge could consist of a movement upon the beam, as by the use of a sleeve, rather than bodily adjusting the beam as shown. In any case the regulation allows the beam and its head 75 to rise under the lifting forces described, or causes it to lower, to its operating position, thus repositioning the inlet valves to regulate the proportions in accordance with the temperature desired, after any new adjustment.

The next function or action is that of the safety stop device 80, 81. This may be initially set to a position to prevent danger of the user setting the regulation to deliver an excessively hot or scalding temperature of mixture. The stop 81 prevents the shoulder 80 and beam from sliding too far to the right with the consequent excessive lifting of the beam head to an extent to open too far the H-valve. Or this safety result can be obtained by adjusting the mounting at the top of the thermostat rod; or these two means can be used cooperatively.

There is also an advantageous compensating function or action inherent in the illustrated structure, being adapted to allow for the almost inevitable irregularities of supply pressures, dealing with unexpected increases or decreases of pressure at the cold or hot inlets, relatively to each other; this feature obviating any need of a pressure equalizer in advance of the inlets C and H. An automatic action takes place readjusting correctively the valves, during otherwise steady conditions and operations, to offset the interference produced by the relative supply pressure changes. This compensating control is effected as a direct result of the liquid pressure variations and apart from the thermostat control; the two functions however operating in harmony.

This self-compensating action utilizes the above-mentioned capacity to be appreciably strained of the parts and connections which cause the shifting or swinging of the control beam 70 and its head 75 to adjust the inlet valves. The strain and yield may be by compression (as of the rod 46, 60), or by flexure (as of beam 70 at its necked-down portion 77) or by play of slack fitting, (as between the elements 66 and 78, or between fulcrum edge 74 and the wall of section 16, or at the elements 71 and 72 or 84 and 85). These several parts may be considered as normally under a medium strain, due to the preponderant lifting action of the C-valve and its spring 38 pressing against the beam head. The specific actions to be described take effect immediately, in advance of, and without awaiting the lag of the thermostat actions, but cooperative therewith, when substantial supply pressure variations occur.

Taking the case of the cold water supply pressure becoming lower for any reason, that is, relatively or beyond any change in the hot water supply, such lowering of pressure first tends to produce decreased flow through the C-valve, but compensatingly also tends inherently to open said valve and maintain flow. As a consequence of the drop of C-pressure the upward force on the beam head at once decreases, and the existing strain in the parts and connections consequently becomes relaxed, but without breaking the contact of the beam head with both of the C and H valve buttons. A slight opening further of the C-valve is thus brought about, with corresponding closing of the H-valve; an appreciable correcting tendency being thereby provided, offsetting wholly or at least largely the effect of the lowered cold water pressure.

If, on the other hand, the H-pressure becomes lowered to some extent, with decreased inflow, for similar reasons the H-valve tends to open somewhat, correspondingly offsetting the lowering of pressure, while the straining of the connecting parts and thermostat rod increases.

Or, if there should occur a rise of C-pressure, with tendency to greater flow, the C-valve becomes forced in its closing direction, putting further strain upon the parts and connections, while shutting off a little the C-valve and opening a little the H-valve; thus offsetting wholly or partly the disturbing change and promptly aiding in bringing the operation into balance again. Conversely if the hot water pressure rises, likewise the H-valve is forced in the closing direction, with balancing of flow and with reduction of the strain on the beam and connecting parts, while the C-valve opens further.

All of the described compensating actions are usefully performed, to an appreciable degree, without breaking mechanical contact of the connections and without interfering in any way with the operation of the thermostat, but tending to aid the thermal control by anticipating and promptly starting the necessary correcting action.

Another condition, for which the present invention affords the function of automatic safety and protection, is the extreme case of the cold water pressure and supply failing wholly, or seriously as below some predetermined safe pressure, with danger of the delivery of extremely hot or scalding water, until the thermostat has overcome its lag and brought about the closing of the H-valve. Under such a condition, the cold water pressure drop causes instantaneously the lowering and opening of the C-valve and the lowering and complete closing of the H-valve. This control, it will be observed, is entirely automatic, being brought about by the supply pressure changes. This result of the illustrated structure becomes operative whenever the cold pressure decreases to a point where no longer are the preponderance of area of the C-valve and its resultant upward force, reinforced by the spring, sufficient to overcome the lowering force of the H-valve supplemented by the weights of the H-valve, the beam and the thermostat rod prolongation. With complete failure of cold water pressure, the C-valve opens to its maximum, while the H-valve closes, the force of the spring however serving to hold the C-valve button in contact with the beam head, but being insufficient to force the beam 70 up into contact with the end 66 of the thermostat rod.

The total cut-off function previously mentioned may be attained intentionally at will in a convenient way by the use of the described regulating means. The handle 98 need only to be turned to an excessive extent until the buttons of both inlet valves run off from the top and bottom surfaces of the flat head of the beam. For example, if the regulator is turned counterclockwise far enough, the beam moving leftward, the head 75 will pass from between the two buttons and allow the buttons to drop into the recesses by which the neck 77 of the beam is formed. This brings about the closing entirely of both valves due to the inlet pressures and flow being in directions to close the valves. Alternatively, if the handle be turned clockwise to the extreme the valve buttons will drop beyond the left extremity of the beam head, again causing the closing of both valves, provided there is no stop 80, 81 to obstruct the action.

Coming to Fig. 6, illustrating the second form of the invention, this differs from the first form mainly in the modified character of the thermostatic mechanism or elements, Fig. 6 omitting much of the fixed casing parts, the cold and hot valves and the manual regulating devices, all of which may illustratively follow the disclosures of Figs. 1 to 3. The basic difference is that whereas the thermostatic mechanism in the first form is of the elongated rod and sleeve type, acting transversely on the control beam to swing it for the valve operations, the second form utilizes the thermostatic principle of a bimetal strip, operating or built into the beam and producing at the beam head, by flexure, the necessary valve operating movements.

Both forms, in common, embody an immersed thermostatic mechanism, including inter alia the control beam, which mechanism is responsive to changes of temperature of the water mixture flowing through the chamber and toward the delivery, and being operative through the transverse shifting of the intake end or head of the beam to cause the further opening of the cold and further closing of the hot valve with rise of mixture temperature, and vice versa, thereby to maintain the desired substantially steady temperature of delivered mixture. The basic operation is therefore seen to be the same in both forms. In either form the responsive pair may be of various pairs of metals, or of non-metallic substances, as plastics, e. g. Lucite; and for that matter other types of response may be employed, such as a liquid-filled capsule or bellows. Such bellows means may be the conventional sealed corrugated chamber containing a liquid of relatively high expansibility; and it may for example be interposed in the length of the rod 46, which latter then need not be but may be of different material from the surrounding sleeve 45, so long as its thermal response is coordinated with the valve actions.

In detail, Fig. 6 shows a valve casing 110 whose body 111 contains a mixing chamber 112 and has a lateral outtake section 113, ascending toward the delivery point, and an access section 116, at the end opposite to the leftward or intake section, the latter not shown. The control beam or bar 170, as a whole, is adapted to slide endwise, guided by the low end 166 of a positioning piece 160, and to swing as it slides; and it has a leftward extension 144 composed mainly of a bimetal strip 145, 146, extending from or secured to the body of the beam as by a rivet 144A. When the mixer has once been set for a given temperature no movements are necessary other than the flexure produced in the bimetal extension 144 responsively to variations of liquid temperature. The head 175 of the beam, at the end of its bimetal extension, thus receives up-and-down transverse movements, analogous to those described for the head 75 in Fig. 1, and such as to open further the C-valve and close further the H-valve with rise of mixture temperature and vice versa. To secure this action the bimetal portion 144 of the beam is built up of a lower bimetal component 145 composed of a material having a lower coefficient of thermal expansion than has the material of the upper component 146.

Aside from the need of adjustment of desired resultant temperature the parts thus far described afford an operative regulator to maintain a steady predetermined temperature, the control beam body being considered as stationary in contact with positioner 160, and the movement being confined to thermal flexure of the bimetal extension 144. In order however to permit regulation at will means are provided for bodily shifting or swinging the beam as a whole in a lateral, i. e. up-and-down, direction, these means being analogous to those shown in Fig. 1. Thus, the control beam 170 has a pivotal or swingable mounting at its righthand end, and near its center at its upper side it is provided or formed with a wedge means or slanting cam surface 178. This sloping cam cooperates with the low end 166 of the adjacent fixed contact member or positioning bracket 160, located for convenience partly inside of the outtake section 113, but extending into the chamber 112. Said fixed piece is contacted by the beam but has no thermostatic action in itself. It is secured fixedly in place as by a set screw 165 operating in a wall recess, where it may be turned by a screw driver, thus to clamp the contact bracket 160, the recess being thereupon closed tightly by a screw plug 165A. The operation of the Fig. 6 form, as regards the beam head shifting action upon the valve pair and the manual setting connections may closely follow the described operation of the first form, requiring no repeat of description therefor.

There have thus been described certain illustrative embodiments attaining the objects and advantages of the present invention; but since many matters of method, operation, combination, construction and detail may be variously modified without departing from the principles of the invention it is not intended to limit the invention to such matters except so far as set forth in the appended claims.

What is claimed is:

1. A liquid mixer of the kind having automatic means to proportion in a regulable manner inlet supplies of cold and hot liquid to deliver a resultant mixture of desired temperature, the same having a hollow casing formed with a body section enclosing a mixing chamber and with extension sections including an intake section and an outtake section and an access section, and comprising therewith, in combination: an opposed pair of unbalanced inlet valves in the intake section for the cold and hot liquids respectively each including a movable gate arranged upstream of its seat so that the inlet pressure and flow thereat tend to close the valve, and the cold water inlet valve being of substantially larger effective area than the other; an immersed control member or longitudinal beam mounted in the casing with its intake end portion shiftable transversely in such mixing chamber and extending into mechanical transmitting relation to or between said pair of valves in a manner to open further either valve while closing further the other whereby to alter the proportions of cold and hot liquid admitted to the chamber; and an immersed thermostatic mechanism including inter alia said control beam and responsive to changes of temperature of the flowing mixture in the mixing chamber, said mechanism being operative through the shifting of such control beam to open further the cold valve and close further the hot valve with rise of mixture temperature, and vice versa, thereby to maintain a substantially steady temperature of delivered mixture; together with setting means, extending through said access section and operable, to adjust the transmitting relation of the control beam to the valve pair whereby to regulate the maintained delivery temperature.

2. A liquid mixer of the kind having automatic means to proportion inlet supplies of cold and hot liquid to deliver a resultant mixture of desired temperature, the same having a hollow casing enclosing a mixing chamber and comprising therewith, in combination: an opposed pair of unbalanced intake valves in an extension of such chamber for the cold and hot liquids respectively each including a movable gate arranged upstream of its seat so that the inlet pressure and flow thereat tend to close the valve, and the cold water inlet valve being of substantially larger effective area than the other; an immersed control member or longitudinal beam mounted with its intake end portion shiftable transversely in such mixing chamber and extending into mechanical transmitting relation to said pair of valves in a manner to open further either valve while closing further the other whereby to alter the proportions of cold and hot liquid admitted to the chamber; and an immersed thermostatic mechanism including inter alia said control beam and responsive to changes of temperature of the flowing mixture in such chamber and operative through the shifting of such control beam to open further the cold valve and close further the hot valve with rise of mixture temperature, and vice versa, thereby to maintain a substantially steady temperature of delivered mixture; whereby promptly and without awaiting thermostatic action, an inlet pressure change, as a drop in the cold inlet supply, causes per se the response of opening further the cold valve while closing further the hot valve, thereby correctively reproportioning the two inflows.

3. A liquid mixer having automatic means to proportion in a regulable manner inlet supplies of cold and hot liquid to deliver a resultant mixture of desired temperature, the same having a hollow casing formed with a body section enclosing a mixing chamber and with extension sections including an intake section and an outtake section and an access section, and comprising therewith, in combination, an opposed pair of inlet valves in the intake section for the cold and hot liquids respectively each including a seat and a movable gate arranged so that the inlet pressure and flow therein tend to close the valve; an immersed control member or longitudinal beam mounted in the casing to be shiftable transversely in such mixing chamber with the intake end portion thereof extending into mechanical transmitting relation to or between said pair of valves in a manner to open further either valve while closing further the other whereby to alter the proportions of cold and hot liquid admitted to the chamber; and a thermostatic means comprising an elongated rod member mounted at its remote end and immersed in the liquid mixture flowing through and beyond said outtake section and having a continuation extending into operative relation with said control beam to cause the shift or swing of the beam in a manner to open further relatively the cold valve and close further the hot valve with rise of mixture temperature, and vice versa, thereby to maintain a substantially steady temperature of delivered mixture; together with setting means extending through said access section and operable exteriorly to adjust the transmitting relation of the control beam to the valve pair whereby to regulate the delivery temperature maintained thereby; the valve gate motions being transverse to the beam length, with the hot valve above the cold valve, whereby a rise of the beam head closes further the cold while opening further the hot valve to change the proportions and resultant; the cold valve having a larger seat port area than the hot valve and a lifting spring, thereby to exert lifting pressure on the cold valve, beam head and hot valve.

4. A liquid mixer having automatic means to proportion inlet supplies of cold and hot liquid to deliver a resultant mixture of desired temperature, the same having a hollow casing enclosing a mixing chamber and comprising therewith, in combination, an opposed pair of intake valves in a first extension of such chamber for the cold and hot liquids respectively each including a seat and a movable gate arranged so that the inlet pressure and flow therein tend to close the valve, and the cold water inlet valve being of substantially larger effective area than the other; an immersed control beam having a head and mounted in the casing to be swingable transversely in such mixing chamber with the intake head end portion thereof extending into mechanical transmitting relation to said pair of valves in a manner to open further either valve while closing further the other whereby to alter the proportions of cold and hot liquid admitted to the chamber; and a thermostatic means comprising an elongated rod member extending through a second extension of such chamber and mounted at its remote end and immersed in the liquid mixture flowing through such chamber and second extension, said rod having a continuation extending into operative relation with said control beam to cause the transverse shift of the beam in a manner to open further relatively the cold valve and close further the hot valve with rise of mixture temperature, and vice versa, thereby to maintain a substantially steady temperature of delivered mixture.

5. A liquid mixer as in claim 4 and wherein the gates of said pair of valves are mounted for motion along a common path of action, and said control beam at its intake end has a head normally occupying such path interposed between said gates, and being of such structure or thickness that in a median position it may hold open both valves, each valve having a bias or tendency to close thus holding it normally in engagement with such head; whereby transverse shiftings of beam open further one while closing further the other valve, as when mixture temperature varies or the beam is adjusted transversely for setting a regulated temperature.

6. A liquid mixer of the kind having automatic means to proportion inlet supplies of cold and hot liquid to deliver a resultant mixture of desired temperature, the same having a hollow casing enclosing a mixing chamber and comprising therewith, in combination: an opposed pair of intake valves in an extension of such chamber for the cold and hot liquids respectively each including a movable gate arranged upstream of its seat so that the inlet pressure and flow thereat tend to close the valve; a control beam immersed longitudinally in the liquid in the chamber and mounted therein with its intake end portion shiftable transversely in such mixing chamber and extending into mechanical transmitting relation to said pair of valves in a manner to open further either valve while closing further the other whereby to alter the proportions of cold and hot liquid admitted to the chamber; and an immersed thermostatic mechanism including inter alia said control beam and responsive to changes of temperature of the flowing mixture in such chamber and operative through the shifting of such control beam to open further the cold valve and close further the hot valve with rise of mixture temperature, and vice versa, thereby to maintain a substantially steady temperature of delivered mixture; the cold valve being substantially greater in effective area than the hot valve; whereby a rapid or abrupt drop of cold pressure will cause quick further or complete closing of the hot valve by the excess pressure of the hot intake water against its upstream gate, and vice versa.

7. A liquid mixer as in claim 6 and wherein the beam is mounted to swing freely transversely in the direction to cause closing of the H-valve, with a yielding means or spring exerting a contrary tendency, whereby upon failure of cold liquid pressure the hot liquid pressure causes prompt closing of the H-valve against such spring tendency.

8. A liquid mixer as in claim 6 and wherein each valve is biased, by gravity or spring, towards its closed position, and the thermostatic mechanism and control beam have sufficient yield to permit valve movements under strain, so that, irrespective of thermostatic response and control, a substantial variation of supply pressure in either inlet by either rise or drop, tending to disturb the proportioning of the liquids, causes a prompt compensatory response to such pressure variation by the opening further of one valve and closing of the other; whereby to initiate corrective action to restore the correct proportioning of liquids to yield the desired resultant temperature thereby to cooperate with the less prompt or lagging corrective action of the thermostatic mechanism.

9. A liquid mixer of the kind having automatic means to proportion inlet supplies of cold and hot liquid to deliver a resultant mixture of desired temperature, the same having a hollow casing enclosing a mixing chamber and comprising therewith, in combination: an opposed pair of intake valves in an extension of such chamber for the cold and hot liquids respectively each including a movable gate arranged upstream of its seat so that the inlet pressure and flow thereat tend to close the valve; an immersed control beam arranged longitudinally with its intake end or head swingable transversely in such mixing chamber and extending into mechanical transmitting relation to said pair of valves in a manner to open further either valve while closing further the other whereby to alter the proportions of cold and hot liquid admitted to the chamber; and an immersed thermostatic mechanism including inter alia said control beam and responsive to change of temperature of the flowing mixture in such chamber and operatively causing the shifting of such control beam to open further the cold valve and close further the hot valve correctively with rise of mixture temperature, and vice versa, thereby to maintain a substantially steady temperature of delivered mixture; together with setting means comprising an exterior movable regulator having connections through a bonnet into a mixing chamber extension and to the immersed beam shank in the chamber for adjusting the transmitting relation of the beam to the valve pair and thereby to set the maintained delivery temperature, said setting means being adapted to act by swinging transversely the intake or head end portion of the beam, without impairing the thermostatic control of the valves, and for that purpose comprising connections extending from the regulator through an interior part operable to shift bodily longitudinally the beam, with a cam or wedging device operable by such shift to cause the transverse swing of the beam thereby to readjust the action of the thermostatic mechanism for a change of maintained temperature.

10. A liquid mixer as in claim 9 and wherein is a longitudinally-fixed part near the beam, and said cam device is a wedge carried directly on the beam to play on said fixed part for causing the transverse swing of the beam.

11. A liquid mixer as in claim 10 and wherein the longitudinally-fixed part is an elongated rod constituting the responsive element of the immersed thermostatic mechanism.

12. A liquid mixer as in claim 9 and wherein the connections from the regulator to the beam comprise a rotary spindle extending through said bonnet, a stem turned by the spindle, a complementary pair of screw threaded members, mutually engaged, the first member turned by the stem to shift longitudinally the second member and beam, namely, in an advancing direction to cause the wedging swing of the beam to shift the valves for a colder liquid mixture, and with retraction of beam to cause the opposite action for hotter mixture.

13. A liquid mixer as in claim 12 and wherein is a safety means comprising an adjustable stop or block in the path of the retracting longitudinal shift of the beam, preventing excess shift and a too high resultant temperature.

14. A liquid mixer as in claim 9 and wherein the control beam has a head at its valve operating end and is shiftable longitudinally for the temperature setting adjustments, and its fittings are such as to permit at will a longitudinal shift in such an excess extent, in one or both directions, as to carry the beam head from between the valve gates, thereby to render both valves free for self-closing, thus to bring about a complete closing and cut off of both valves.

CHARLES B. ARNOLD.

REFERENCES CITED

The following references are of record in the file of this patent:

UNITED STATES PATENTS

| Number | Name | Date |
|---|---|---|
| 549,035 | Tobey | Oct. 29, 1895 |
| 549,169 | Tobey | Nov. 5, 1895 |
| 1,873,769 | Lang | Aug. 23, 1932 |
| 1,934,499 | Hall | Nov. 7, 1933 |
| 1,954,903 | Walker | Apr. 17, 1934 |